United States Patent [19]

Hecht et al.

[11] Patent Number: 5,402,696
[45] Date of Patent: Apr. 4, 1995

[54] SEAL INSERT FOR THE SHAFT FOR A WORK PIECE

[75] Inventors: Gil Hecht, Naharia; Amir Satran, Kfar Vradim, both of Israel

[73] Assignee: Iscar Ltd., Migdal Tefen, Israel

[21] Appl. No.: 183,202

[22] Filed: Jan. 14, 1994

Related U.S. Application Data

[63] Continuation of Ser. No. 935,086, Aug. 24, 1992, abandoned.

[30] Foreign Application Priority Data

Aug. 26, 1991 [IL] Israel .......................................... 99297

[51] Int. Cl.⁶ .................... B23B 29/00; B23B 5/22; F16C 33/02
[52] U.S. Cl. .......................................... 82/158; 279/20; 384/281; 384/296; 407/11; 408/57
[58] Field of Search ...................... 82/158, 159; 279/20; 407/11; 408/57, 59; 384/281, 280, 285, 296

[56] References Cited

U.S. PATENT DOCUMENTS

| | | | |
|---|---|---|---|
| 2,909,376 | 10/1959 | Drew | 407/11 X |
| 3,287,998 | 11/1966 | Goernert et al. | 408/59 |
| 3,907,453 | 9/1975 | Bennett | 407/11 X |
| 3,985,367 | 10/1976 | Martino et al. | 279/20 |
| 5,020,946 | 6/1991 | Nann | 407/11 X |

FOREIGN PATENT DOCUMENTS

| | | | |
|---|---|---|---|
| 0212763 | 3/1987 | European Pat. Off. | F16L 17/02 |
| 3246515 | 6/1984 | Germany | 269/20 |
| 518181 | 3/1955 | Italy | 408/59 |
| 3-75912 | 7/1991 | Japan | B23B 28/03 |
| 453647 | 2/1992 | Japan | 408/56 |
| 1128755 | 10/1968 | United Kingdom | F16L 21/00 |
| 1243547 | 8/1971 | United Kingdom | F16B 43/00 |
| 1595171 | 8/1981 | United Kingdom | F16J 15/10 |
| 2115891 | 9/1983 | United Kingdom | F16J 15/00 |

*Primary Examiner*—Timothy V. Eley
*Attorney, Agent, or Firm*—Pennie & Edmonds

[57] ABSTRACT

A sealing bushing is provided for use with a liquid cooled metal cutting tool of the kind having an elongated tool shaft for mounting with respect to a machine tool turret and formed with a cooling duct, the sealing bushing comprising a tubular member and an annular channel member formed integrally with and surrounding an end portion of the tubular member; the channel member being constituted by the end portion and a skirt portion radially spaced from the tubular portion and integrally coupled thereto by a flange portion, at least the skirt portion being formed of a flexibly resilient material.

4 Claims, 5 Drawing Sheets

SEAL INSERT FOR THE SHAFT FOR A WORK PIECE

This is a continuation of application Ser. No. 07/935,086, filed Aug. 24, 1992, now abandoned.

FIELD OF THE INVENTION

This invention relates to liquid cooled metal cutting tools and in particular to a sealing bushing for use with such tools.

BACKGROUND OF THE INVENTION

Metal cutting tools of the kind to which the present invention relates are generally formed with an elongated shaft for mounting on a machine tool turret, the shaft having formed therein a cooling duct. The tool is furthermore provided with means by which cooling liquid is introduced into the duct. The cooling liquid exits from the duct via appropriate apertures so as to be directed onto the work piece. In use therefor, means must be provided for ensuring that the cooling liquid supply conduit is effectively coupled to the shaft. It is known to provide the cooling duct in the region thereof adjacent a rear surface of the tool shaft with screw threading thereby allowing for the screw coupling of the liquid supply conduit to the shaft. This solution is effective as long as one is dealing with metal cutting tools having elongated tool shafts of fixed standard length. In many cases, however, and in order to allow for the ready mounting of the tool, it proves to be necessary to modify the length of the tool shaft by cutting away a portion thereof. This cutaway portion, of course, includes the threaded portion of the cooling duct and the thus modified cutting tool can no longer be readily screw coupled to the liquid supply conduit.

It has been proposed in Japanese published Utility Model Application No. 3-75912, to overcome this problem by fitting the mouth of the cooling duct with a tubular, internally threaded bushing into which a correspondingly threaded end of the supply conduit can be screw coupled. In this way, the conduit can be screw coupled to the elongated shaft even though the length of that shaft may have been modified and the mouth of the conduit is no longer provided with its own screw threading.

Whilst this proposal is relevant where the cutting tool is directly mounted on the machine tool turret and the cooling liquid supply conduit is directly coupled to the tool shaft, an entirely different problem arises where the cutting tool is mounted on the machine tool turret via an intermediate adaptor. In such a case the end of the tool shaft which includes the mouth of the cooling duct is received within the adaptor and the tool shaft is clamped to the adaptor. It is clearly not possible to couple the liquid cooling duct to the end of the tool shaft and the adaptor is provided with a cooling fluid entry port which communicates on the one hand with the cooling duct and, can be coupled on the other hand to the cooling supply conduit. Thus, the cooling liquid enters the adaptor and passes into the cooling duct. It is however clear that if the end portion of the tool shaft held within the adaptor is not sealingly fitted to the adaptor, cooling liquid will flow out of the adaptor around the walls of the tooling shaft. In practice, it is difficult and sometimes impossible to ensure a sealing fit of the tool shaft within the adaptor and this, particularly in view of the fact that the tool shaft which is of general circular cross-sectional shape, is formed with planar surface portions on which bear clamping screws which serve to clamp the adaptor to the tool shaft.

It is an object of the present invention to provide means for use with a liquid cooled metal cutting tool which overcomes the above-referred to problems, when the tool is mounted via an intermediate adaptor.

BRIEF SUMMARY OF THE INVENTION

According to the present invention there is provided for use with a liquid cooled metal cutting tool of the kind having an elongated tool shaft for mounting with respect to a machine tool turret and formed with a cooling duct, a sealing bushing comprising a tubular member and an annular channel member formed integrally with and surrounding an end portion of the tubular member, said channel member being constituted by said end portion, and a skirt portion radially spaced from said tubular portion and integrally coupled thereto by a flange portion, at least said skirt portion being formed of a flexibly resilient material.

There is furthermore provided in accordance with the present invention in combination, a metal cutting tool having an elongated tool shaft formed with a cooling duct; an adaptor member for mounting on a machine tool turret adapted to receive said tool shaft and to be clamped thereto; a cooling fluid entry port formed in said adaptor member and communicating with said cooling duct; a sealing bushing comprising a tubular member for fitting into said cooling duct and an annular channel member constituted by said end portion and a skirt portion radially spaced from said tubular portion and integrally coupled thereto by a flange portion, bearing on an end surface of said shaft, said skirt portion bearing sealingly against an internal surface of the adaptor at least the skirt portion being formed of a flexibly resilient material.

Thus, when cooling liquid flows into the adaptor from the cooling fluid entry port, it is directed into the cooling duct and into the channel member pressing the skirt portion of the channel member sealingly against the internal surface of the adaptor and thus, effectively sealing the adaptor against any leakage of the cooling liquid between the walls of the tool shaft and the adaptor.

In accordance with a further embodiment of the present invention the tubular member of the sealing bushing is formed with internal threading in the region of the end portion and this allows for the use of the sealing bushing in the effective coupling of the cooling liquid supply conduit directly to the tool shaft irrespective of whether the mouth of the cooling duct is formed with threading or not. Thus, one and the same sealing bushing can be used either for direct coupling of the cooling conduit to the tool shaft or, for the sealing of the tool shaft vis a vis an adaptor in which it is held.

BRIEF SUMMARY OF THE DRAWINGS

For a better understanding of the present invention and to show how the same may be carried out in practice, reference will now be made to the accompanying drawings in which.

DESCRIPTION OF PREFERRED EMBODIMENTS

Figure 1:
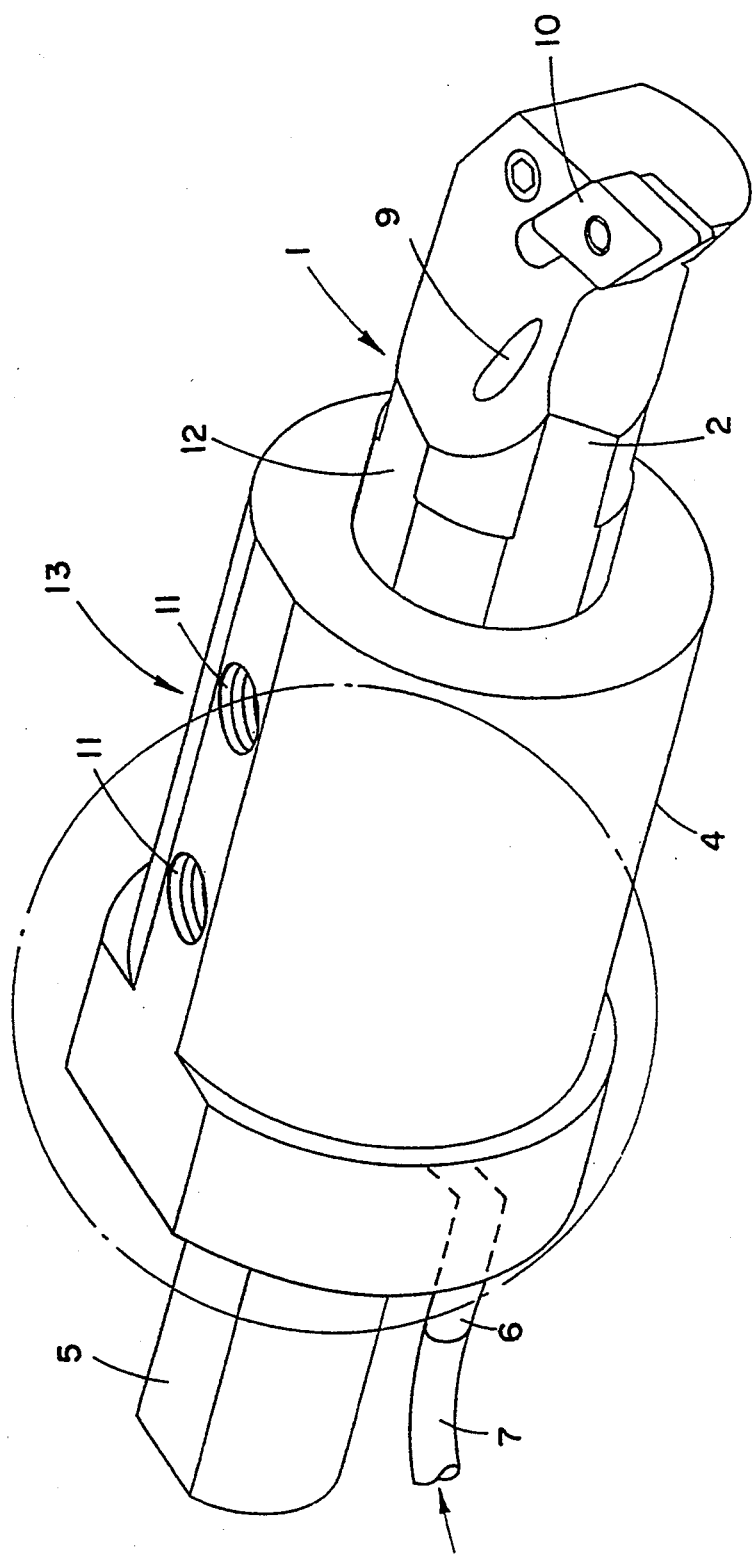
FIG. 1 is a perspective view of a metal cutting tool held in an adaptor and of a kind to which the present invention particularly relates.
Figure 2:
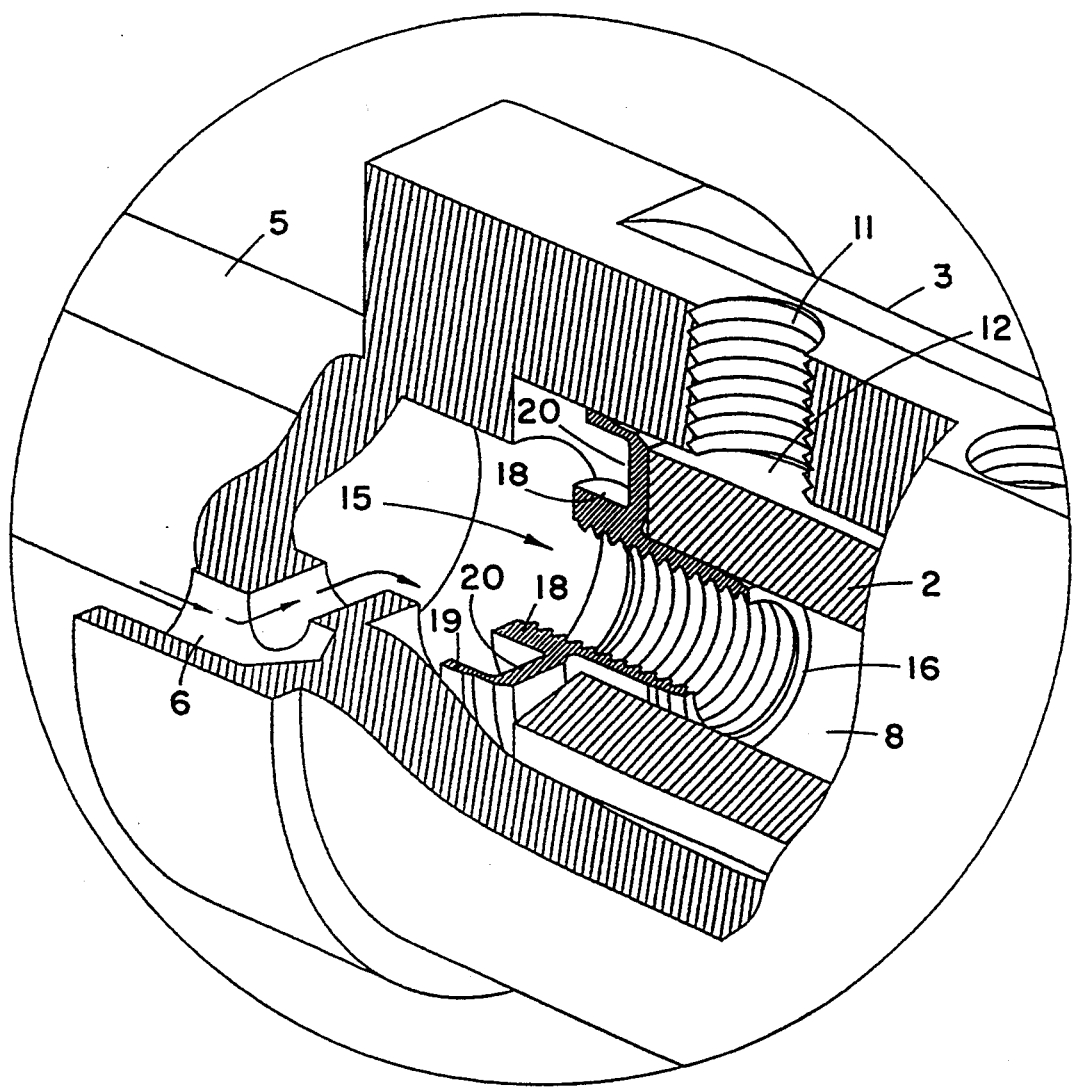
FIG. 2 is a partially cross-section in large view of a detail of the cutting tool and adaptor shown in FIG. 1.

As seen in FIGS. 1 and 2 a metal cutting tool 1 having an elongated tool shaft 2 is fitted into a cup 3 of an adaptor 4. The cup 3 is integrally formed with a mounting rod 5 by means of which the tool 1 and adaptor 4 can be mounted on the turret of a machine tool (not shown). The adaptor cup 3 is formed with a cooling liquid entry port 6 which is, on the one hand coupled to a cooling liquid supply conduit 7 and, on the other hand, communicates with the interior of the adaptor cup 3.

Formed in the tool shaft 2 is a co-axial cooling duct 8 (FIG. 2) the cooling duct 8 communicating with cooling outlets 9 located adjacent a cutting insert 10.

The tool shaft 2 is clampingly retained within the adaptor cup 3 by means of clamping screws (not shown) which are screwed into threaded holes 11 formed in the wall of the adaptor cup 3 and adapted to bear clampingly against planar, axially directed surface portions 12 of the otherwise cylindrical tool shaft 2.

A sealing bushing 15 is fitted to an end portion of the tool shaft 2. The sealing bushing 15 comprises a tubular member 16 and an integrally formed channel member 17. The channel member 17 is constituted by an end portion 18 of the tubular member 16 and by a skirt portion 19 which is radially spaced from the tubular portion 16 and is integrally coupled thereto by a flange portion 20. The tubular portion 16 is internally threaded and is fitted into the mouth of the cooling duct 8 so that the flange portion 20 rests on an end surface 21 of the tool shaft 2.

In use cooling liquid passes from the cooling liquid supply conduit 7 through the port 6 into the interior of the adaptor cup 3 flowing in the direction of the arrows. The cooling liquid then passes through the tubular portion 16 into the cooling duct 8 emerging from the tool shaft via the outlet apertures 9 so as to be sprayed on to the work piece (not shown). At the same time, the cooling liquid enters the channel member 17 and the cooling liquid pressure causes the flexible skirt portion 19 to be pressed sealingly against the inner wall of the adaptor cup 3.

Figure 3A:
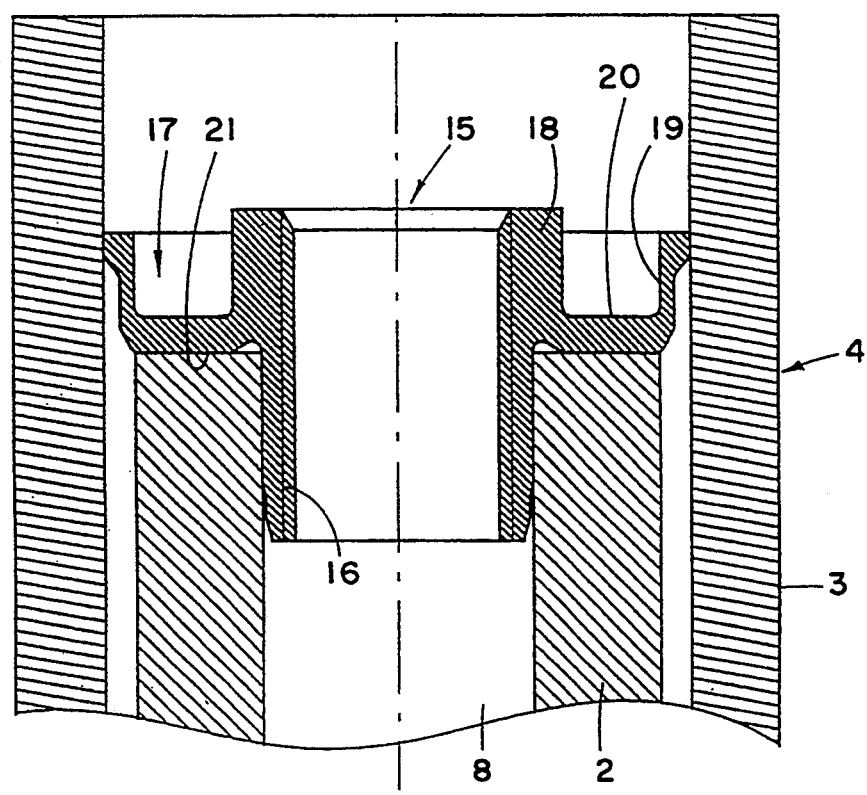
FIG. 3a is a longitudinally sectioned view of the detail shown in FIG. 2.
Figure 3B:
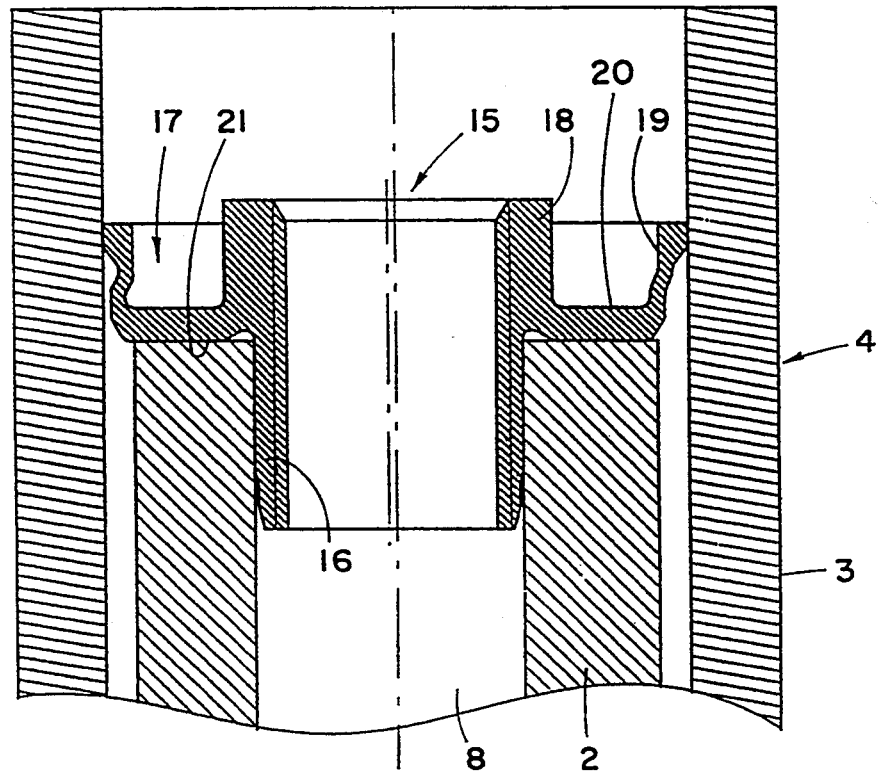
FIG. 3b is a similar view to that shown in FIG. 3a for the situation where the longitudinal axis of the tool shaft and the adaptor are slightly offset with respect to each other.

FIG. 3a of the drawings shows this sealing effect when the tool shaft 2 is co-axial with the adaptor cup 3 and FIG. 3b shows that this sealing is equally well achieved even though the respective axes of the tool shaft 2 and the adaptor cup 3 are slightly offset.

Figure 4:
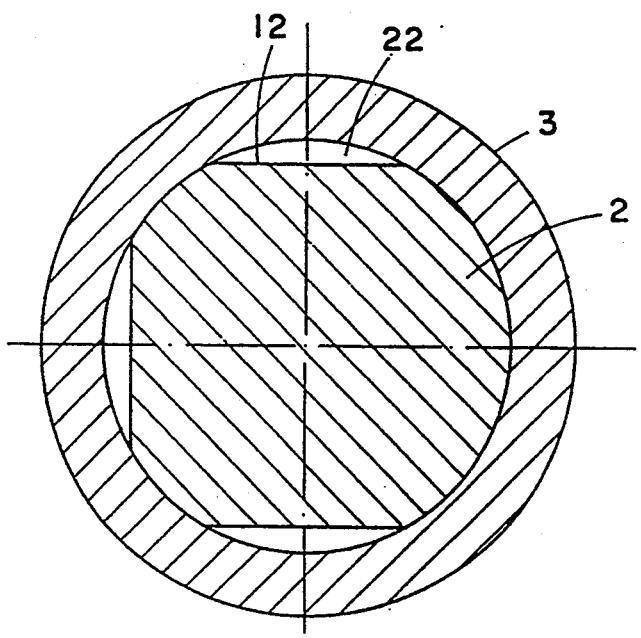
FIG. 4 is a longitudinal sectioned view of the tool and adaptor along the lines 4—4 in FIGS. 3a and 3b.

It will therefore be appreciated that an effective sealing is achieved which prevents the leakage of the cooling liquid from the adaptor cup 3 via the longitudinally extending passages 22 seen in FIG. 4 of the drawings which are formed between the internal wall of the adaptor cup 3 and the planar surface portions 12 of the tool shaft 2.

Whilst the sealing bushing 15 as described above is specially designed to effect sealing against leakage of cooling liquid when a cutting tool 1 is mounted on the turret of a machine tool via an adaptor 4, the same sealing bushing 15 can be utilized for coupling a cutting tool 1 which is directly mounted on the turret of the machine tool, to a cooling liquid supply conduit.

Figure 5:
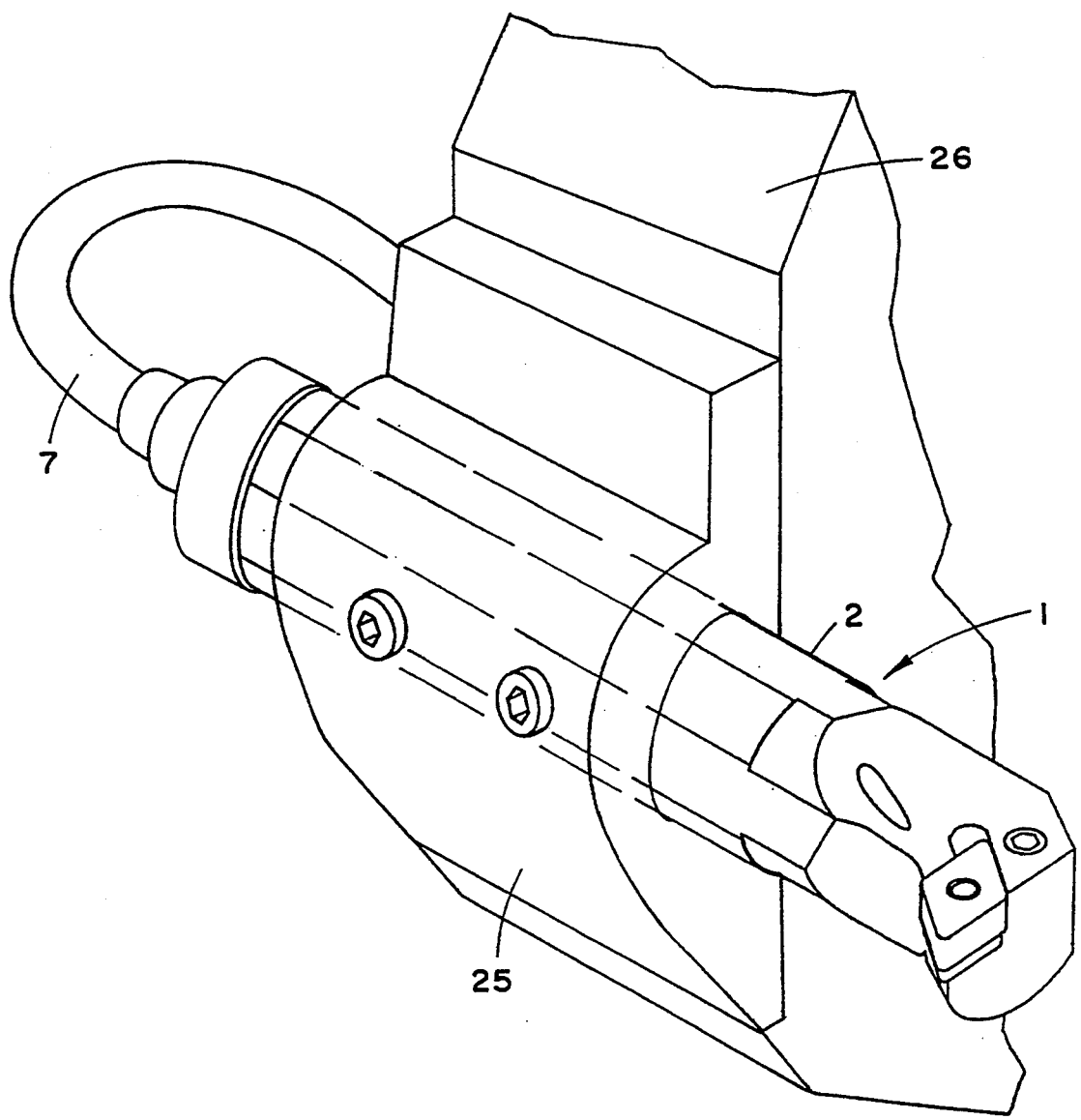
FIG. 5 is a perspective view of a metal cutting tool of the kind to which this invention is applied when mounted directly on the turret of a machine tool.

Thus, FIG. 5 shows such a tool 1 wherein its tool shaft 2 is directly mounted via a clamping collar 25 to a turret 26 of a machine tool (not otherwise shown) with a cooling fluid supply conduit 7 coupled to the rear end of the tool shaft 2.

Figure 6:
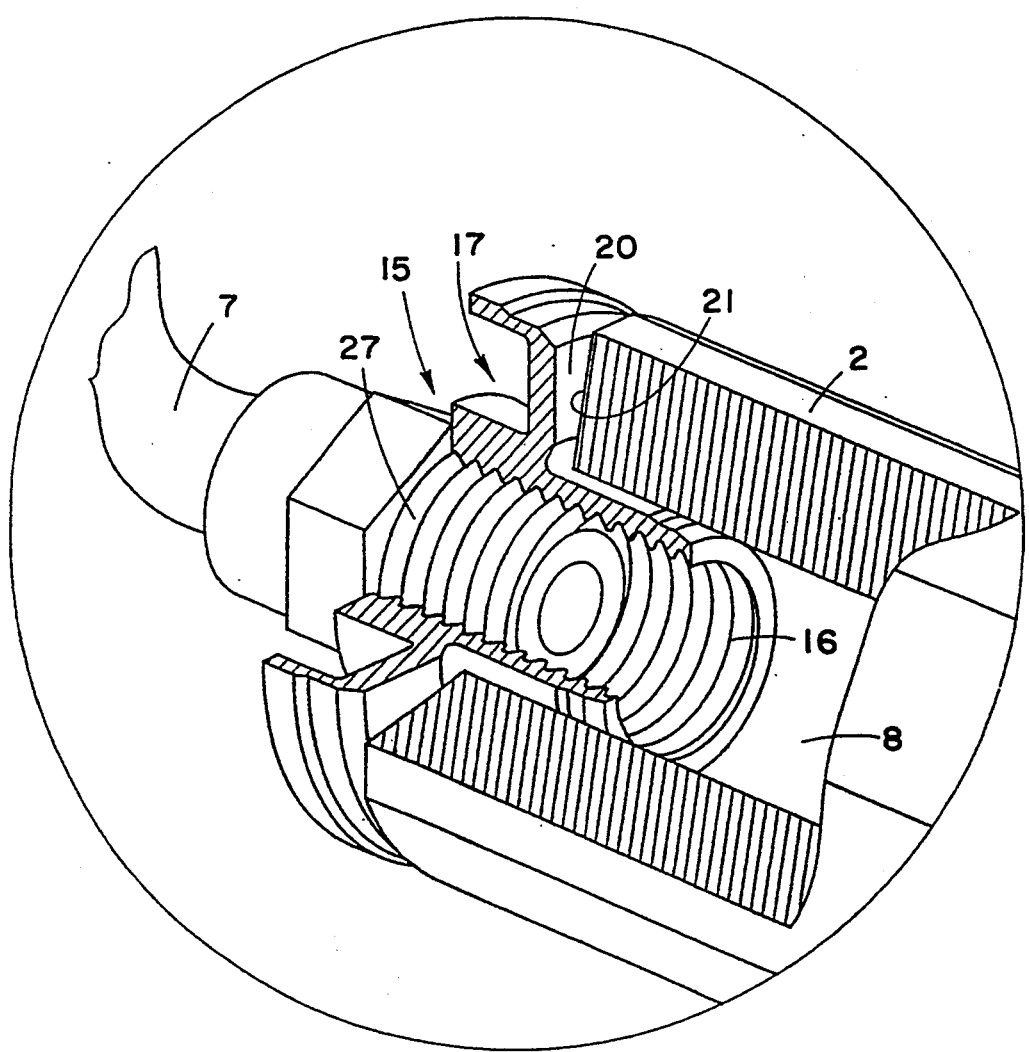
FIG. 6 is a partially cross-sectioned perspective view of an end portion of the cutting tool shown in FIG. 5.

As seen in FIG. 6 of the drawings, the tool shaft 2 which, as before is provided with a cooling duct 8, has inserted into the open end of the cooling duct 8, the tubular portion 16 of the sealing bushing 15 so that the flanged portion 20 bears against the end surface 21 of the tool shaft 2. The liquid supply conduit is provided with a threaded coupling nipple 27 which is screwed into the internally threaded tubular portion 16, the act of screwing the nipple 27 into the tubular portion 8 causing a radial expansion of the tubular portion 16 so that the latter bears sealingly against the inner wall of the cooling duct 8. In this way, an effect and simple coupling of the cooling liquid supply conduit 7 to the tool shaft 2 is effected and does not require threading the mouth of the cooling duct 8 itself. Thus, it is possible to adjust the length of the tool shaft 2 as required seeing that in all cases, coupling can be effected merely by the insertion of the sealing bushing 15.

It will therefore be seen that the sealing bushing in accordance with the invention is an item which is capable of universal application for effective and sealing coupling of a fluid supply conduit to a metal cutting tool, whether the latter is mounted directly on the turret of a machine tool or whether it is mounted via the intermediary of a suitable adaptor.

We claim:

1. In combination, a metal cutting tool having an elongated tool shaft formed with a cooling duct; an adaptor member for mounting on a machine tool turret adapted to receive said tool shaft and to be clamped thereto; a cooling fluid entry port formed in said adaptor and communicating with said cooling duct; a sealing bushing comprising a tubular member for fitting into said cooling duct and an annular channel member formed integrally with and surrounding an end portion of the tubular member; said channel member being constituted by said end portion, a skirt portion radially spaced from said tubular portion and integrally coupled thereto by a flange portion, bearing on an end surface of said shaft, said skirt portion bearing sealingly against an internal surface of said adaptor at least said skirt portion being formed of a flexibly resilient material.

2. A sealing bushing for use with a liquid cooled metal cutting tool of the kind having an elongated tool shaft for mounting with respect to a machine tool turret and formed with a cooling duct having an inner wall, said sealing bushing comprising an elongated tubular member having a first end and a second end connected to said first end by a tubular portion, said second end and an adjacent region of said tubular portion being adapted for insertion into said cooling duct of said tool shaft in opposed relation to said inner wall; and a substantially U-shaped annular channel member formed integrally with and surrounding said first end of the tubular member; said channel member being constituted by said first end and a skirt portion radially spaced from said tubular portion and integrally coupled thereto by a flange portion; said channel member defining a channel facing in a direction away from said second end and away from said tool shaft upon insertion of said second end into the cooling duct of said tool shaft; at least said skirt portion being formed of a flexibly resilient material; and said tubular member being formed with internal threading in the region of said first end.

3. A sealing bushing according to claim 2, wherein said bushing is formed of a plastics material.

4. A sealing bushing according to claim 2, wherein said bushing is formed of a flexibly resilient material capable of radial expansion in the region of said first end upon threading of a member into engagement with said internal threading of the tubular member.

* * * * *